United States Patent Office 2,771,929
Patented Nov. 27, 1956

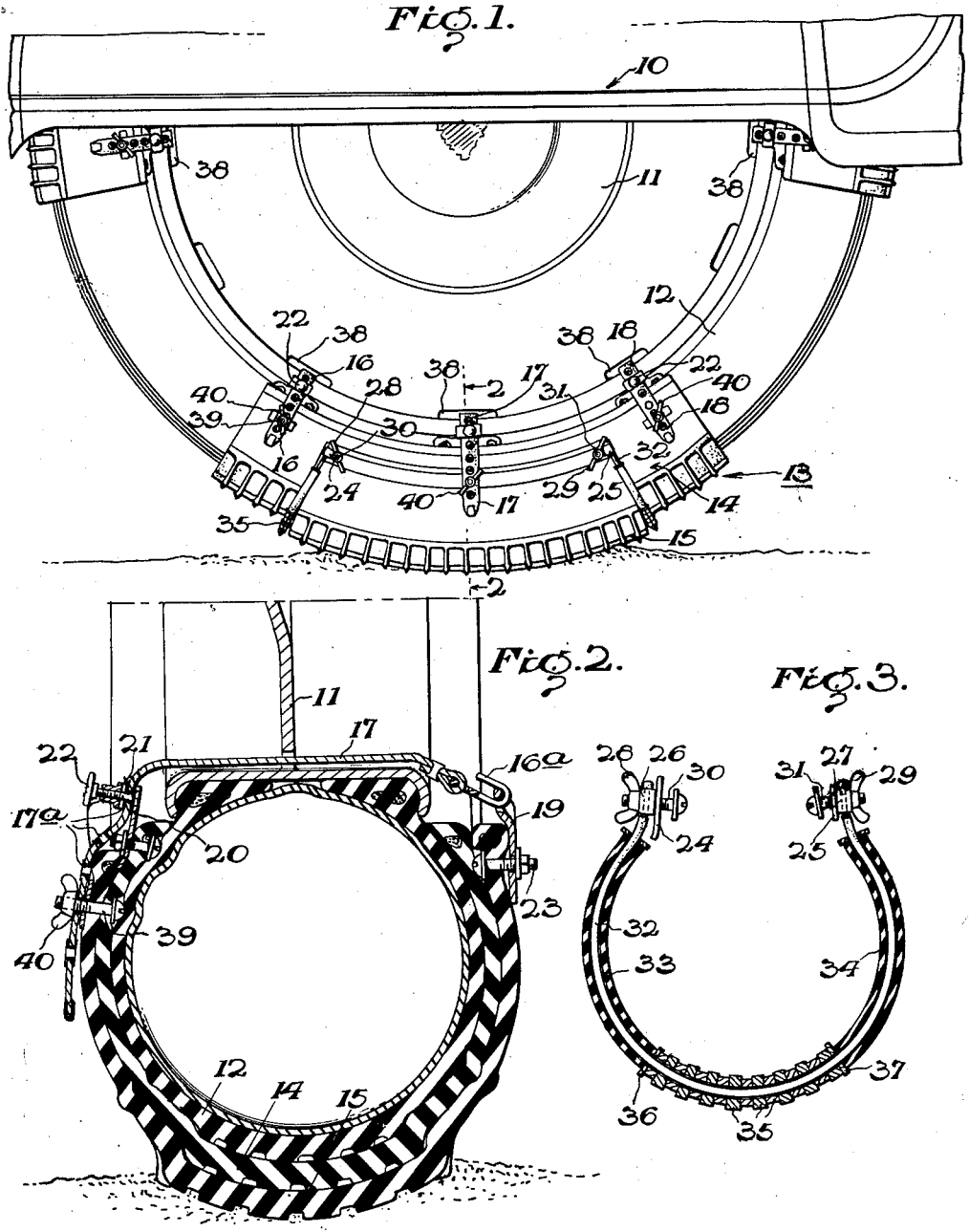

2,771,929
ANTI-SKID AND ANTI-BOGGING DEVICE FOR TIRES

Joseph Alterio and Louis Alterio, Garfield, N. J.

Application January 17, 1955, Serial No. 482,025

2 Claims. (Cl. 152—222)

Our present invention relates to an attachment for vehicle tires to provide safety for winter driving.

It is an object of our invention to provide a double-acting tire attachment for use on vehicle wheels travelling on ice or through snow, whereby the same reduces side sliding and wheel spinning on ice and also serves to lift the rear of the vehicle to prevent wheel bogging in snow or mud.

Another object is to provide in combination a dual acting anti-skid and anti-bog device having the additional feature of tire protection against excessive tire wear during winter driving, such as usually results from wheel spinning on slippery surfaces.

With the above and other objects in view which will become apparent as the present invention is fully understood, the same resides in the novelty of construction, combination and arrangement of dual acting elements hereinafter described in detail and distinctly claimed in the appended claims.

The following description should be read in conjunction with the accompanying drawing, wherein:

Fig. 1 is a side elevational view of a portion of an automobile wheel and tire with the present novel invention applied thereto;

Fig. 2 is a cross section view taken along section line 2—2 of Fig. 1; and

Fig. 3 is a cross section view of the anti-skid member separate from the anti-bog part of the device.

Similar reference characters designate corresponding parts throughout the various figures of the drawings.

Referring to the drawings in detail and first with particular reference to Figs. 1 and 2, there is disclosed the lower edge of the side of an automobile mud-guard 10 with a portion of a wheel 11 and a tire 12 on the wheel with our novel combined anti-skid and anti-bog attachment 13 mounted thereon. The novel attachment 13 comprises a plurality of tire segments or sections 14 and 15 superimposed upon each other and mounted around the wheel tire 12 by means of one or more securing straps 16, 17 and 18. The number of these straps used will depend upon the number of tire enclosing or embracing sections superimposed in pyramidal formation. For example, the sections 14 and 15 of the attachment 13, which we may call a snow boot, carries spaced apart strap coupling means, such as slotted plates 19 secured by a bolt 23 at the top lip of one side of the same, while the opposite side of the snow boot 13 carries a buckle plate 20 having a strap loop opening 21 with a centrally threadable bolt 22. Each strap comprises a coupling hook 16$^a$ and a plurality of eyelet openings 17$^a$ at the opposite end adapted to be penetrated by the buckle bolt 22.

As disclosed, the section 15 at a point adjacent the respective ends of the opposite ends of each of the opposite top lips of the section 15 has a plate 24 and 25, see Fig. 3. Each plate 24 and 25 are for mounting the anti-skid means, which plates each include a wire coupler 26 and 27, respectively, which clamps are forced to clamping position by an associated wing nut 28 and 29, respectively, on bolts 30 and 31, see Fig. 3. These bolts extend from inside the section casing 15 to the exterior side thereof to support the wing nuts and wire clamps. A wire 32 is looped around section 14 of the snow boot 13 and leads through sections of hose 33 and 34 substantially equal in length to each side wall of the section 15 in a manner such as to leave a space on the wire at the middle of the wire loop for a series of irregular anti-skid devices 35. These anti-skid devices comprise ice breaking irregular bodies, such as hexagonal or octagonal bodies with an opening through which the wire 32 extends to the clamps 26 and 27 at each end of the wire. Each end of hose adjacent the anti-skid section is preferably separated therefrom by a washer 36 or 37 to protect the hose ends from wear and tear and also to permit the irregular bodies to revolve upon the wire 32 during wheel traction, to thereby cause them to cut into hard snow or ice.

When the complete assembly 13 is mounted over the tire 12, the straps 16, 17 and 18 are put through slots 38 in the wheel 11 after first engaging each of the coupling hooks 16$^a$ with the slot in plate 19. Then the straps are pulled downward through the buckle plate strap loops 21 until tight and the bolt 22 is threaded into an adjacent eyelet opening 17$^a$ to lock the strap in tightened position. The dangling end of each strap is next fastened to the side of section 15 of the snow boot 13 by bolts 39 and wing nuts 40, which bolts project through an adjacent eyelet in the respective strap ends.

From the foregoing description of the combination of elements, the general use and functions of the elements in action are believed obvious. For example, when the snow boots 13, which are formed of the plural sections 14 and 15 are applied to the wheel 11 around the tire 12, their respective ends may be positioned in abutment or they may be circumferentially spaced apart as specifically shown in Fig. 1. If the softer snow or mud is deep and soft, then it is preferable to space the snow boots apart to obtain a lifting action for the wheels, while, if the snow is packed and the surface is ice, it is preferable to place the snow boot ends in abutment, so as to provide for more of the anti-skid means to each tire.

When travelling in deep snow or mud the lifting action of the pyramided layers of rubber 14 and 15, for example, will alternately raise and lower the wheels and thereby prevent bogging and while travelling over ice the anti-skid means 35 will cut into the ice surface and provide traction without injury to the tire 12.

Thus we have provided a novel combination attachment for vehicle tired wheels, which will be efficient in action on hard ice surfaces or on deep soft snow or mud surfaces.

While the foregoing description only describes one form of the device, it is to be expressly understood that variations in the form, shape or number of the elements used in the combination may be varied or changed without departing from the scope of the present invention. To determine the scope of the present invention reference should be had to the appended claims.

We claim:

1. A combined anti-bog and anti-skid means comprising a tire casing section of a predetermined arcuate length, a second tire casing section of less arcuate length than said first section and superposed thereon, said second section having its ends equally spaced from corresponding ends of said first section, said first section being adapted for seating engagement with a tire mounted on a wheel and having means adjacent each end thereof for releasable engagement with the wheel, said second section having means intermediate its ends for releasable engagement with the wheel, an arcuate anti-skid device looped around said first section adjacent each end of said second section, and means for releasably securing the ends of said anti-skid devices to said second section at the opposite ends thereof.

2. The structure according to claim 1, wherein each of said anti-skid devices comprises a wire loop generally conforming to the outer wall of said second section, with the opposite ends of which said last means are engaged, a hose section surrounding said wire loop at each of the opposite ends thereof and extending from adjacent said opposite ends to points adjacent the tread of said second section, a plurality of polygonal members freely supported on the central tread portion of said loop intermediate adjacent ends of said hose sections, and a washer disposed between each of said hose section adjacent ends and an adjacent polygonal member.

References Cited in the file of this patent

UNITED STATES PATENTS

| | | |
|---|---|---|
| 1,325,245 | Hodges | Dec. 16, 1919 |
| 1,965,073 | Ginsberg | July 3, 1934 |
| 2,046,159 | Gottlieb | June 30, 1936 |
| 2,452,831 | Burkhart | Nov. 2, 1948 |
| 2,634,780 | Barnes | Apr. 14, 1953 |
| 2,638,953 | Mulholland | May 19, 1953 |
| 2,693,838 | Dandurand | Nov. 9, 1954 |
| 2,714,914 | Champigny | Aug. 9, 1955 |